(12) United States Patent
Yamanaka

(10) Patent No.: US 12,741,504 B2
(45) Date of Patent: Sep. 22, 2026

(54) EXHAUST AIR PATH STRUCTURE OF POWER CONVERTER

(71) Applicant: TOYOTA JIDOSHA KABUSHIKI KAISHA, Toyota (JP)

(72) Inventor: Noriyuki Yamanaka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 388 days.

(21) Appl. No.: 18/488,403

(22) Filed: Oct. 17, 2023

(65) Prior Publication Data

US 2024/0198758 A1 Jun. 20, 2024

(30) Foreign Application Priority Data

Dec. 14, 2022 (JP) ................................ 2022-199732

(51) Int. Cl.
*B60H 1/00* (2006.01)
*B60H 1/14* (2006.01)

(52) U.S. Cl.
CPC ......... *B60H 1/00564* (2013.01); *B60H 1/143* (2013.01); *B60H 2001/003* (2013.01)

(58) Field of Classification Search
CPC ............................ B60H 1/00564; B60H 1/143
See application file for complete search history.

(56) References Cited

U.S. PATENT DOCUMENTS

2018/0334194 A1 11/2018 Do
2020/0313256 A1* 10/2020 Kuronuma ............ H01M 10/66

FOREIGN PATENT DOCUMENTS

DE 102014225807 B4 * 3/2019 ........... B60K 11/085
JP 2004-172639 A 6/2004
JP 2012-158247 A 8/2012
JP 2013-220782 A 10/2013
JP 2018-111455 A 7/2018
JP 2020-082889 A 6/2020

* cited by examiner

*Primary Examiner* — Ngoc T Nguyen
(74) *Attorney, Agent, or Firm* — SoraIP, Inc.

(57) ABSTRACT

An exhaust air path structure of a power converter of the present disclosure, the exhaust air after cooling the power converter provided in the vehicle interior by the air cooling device, configured to be discharged into the vehicle interior through the duct connected to the air cooling device, the exhaust air path structure of a power converter, with respect to at least a portion of the exhaust air path formed on the downstream side in the flow direction of the exhaust air than the outlet portion of the duct, a member having high thermal insulation is provided on the vehicle interior side, a member having high heat conductivity is provided on the outside of the vehicle cabin, the exhaust air path by the member having high thermal insulation and the member having high heat conductivity is configured to sandwich.

3 Claims, 1 Drawing Sheet

EXHAUST AIR PATH STRUCTURE OF POWER CONVERTER

CROSS-REFERENCE TO RELATED APPLICATION

This application claims priority to Japanese Patent Application No. 2022-199732 filed on Dec. 14, 2022, incorporated herein by reference in its entirety.

BACKGROUND

1. Technical Field

The present disclosure relates to an exhaust air path structure of a power converter.

2. Description of Related Art

Japanese Unexamined Patent Application Publication No. 2004-172639 (JP 2004-172639 A) discloses a technique for cooling a power converter by a heat pipe type cooling device that performs cooling by natural convection.

SUMMARY

In a configuration in which the air in a vehicle cabin is sent to the power converter provided in the vehicle cabin of a vehicle to be cooled, when the temperature in the vehicle cabin excessively rises due to the heat of the exhaust air after the power converter is cooled, the cooling efficiency of the power converter may be deteriorated.

The present disclosure has been made in view of the above problem, and an object thereof is to provide an exhaust air path structure of a power converter capable of reducing the temperature rise in a vehicle cabin.

In order to solve the above-described problem and to achieve the object, the present disclosure provides an exhaust air path structure of a power converter. In an exhaust air path structure of a power converter according to the present disclosure, an exhaust air path structure of a power converter is configured to discharge an exhaust air after cooling a power converter provided in a vehicle cabin by an air cooling device into the vehicle cabin through a duct connected to the air cooling device, and for at least a part of an exhaust air path provided on a downstream side of an outlet portion of the duct in a flow direction of the exhaust air, a member having high thermal insulation is provided inside the vehicle cabin, a member having high heat conductivity is provided outside the vehicle cabin, and the exhaust air path is configured to be sandwiched between the member having high thermal insulation and the member having high heat conductivity.

Thus, the exhaust air path structure of a power converter according to the present disclosure can promote heat radiation to the outside of the vehicle cabin while the exhaust heat passes through the exhaust air path, thereby reducing the temperature rise in the vehicle cabin.

In addition, in the above aspect, the member having high thermal insulation may be made of expanded polypropylene, and the member having high heat conductivity may be made of stainless steel.

As a result, it is possible to easily realize a configuration in which a member having high thermal insulation is provided inside a vehicle cabin and a member having high heat conductivity is provided outside the vehicle cabin.

The exhaust air path structure of a power converter according to the present disclosure can promote heat radiation to the outside of the vehicle cabin while the exhaust heat passes through the exhaust air path, thereby reducing the temperature rise in the vehicle cabin.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of an exhaust air path structure of a power converter according to the present disclosure will be described. This embodiment is not intended to limit the present disclosure.

Figure 1:
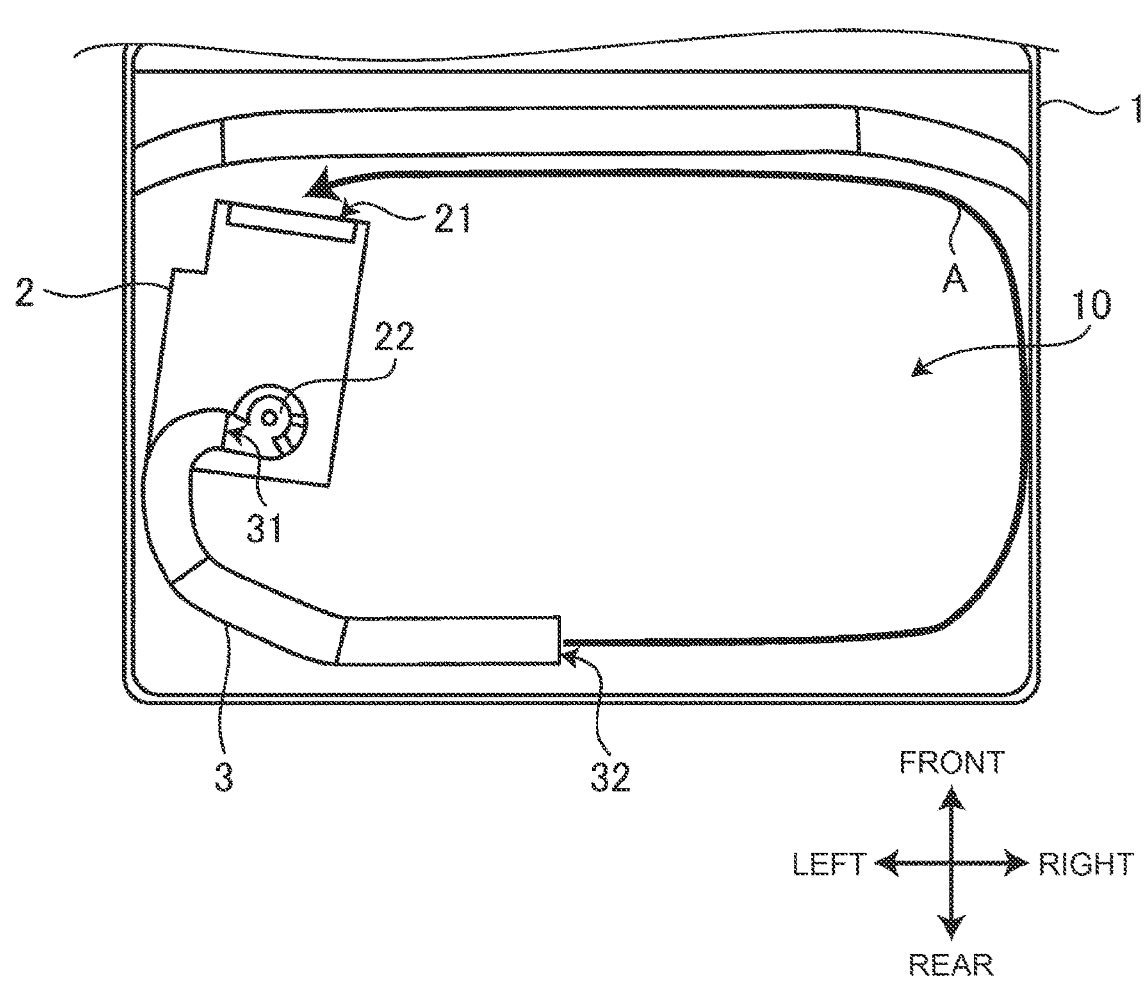
FIG. 1 is a view illustrating a vehicle cabin of a vehicle equipped with a power converter according to an embodiment.

FIG. 1 is a diagram illustrating a vehicle cabin 10 of a vehicle 1 in which a power converter 2 according to an embodiment is mounted.

In the vehicle 1 according to the embodiment, as shown in FIG. 1, an air-cooled power converter 2 using air in the vehicle cabin 10 is mounted in the vehicle cabin 10 such as a luggage space provided in a rear portion of the vehicle 1. In the power converter 2, various electronic components and the like are housed in a housing. The power converter 2 is, for example, an AC charger. An intake port 21 is provided on a side surface of the housing of the power converter 2 on the vehicle front side. In addition, an air cooling device 22 is provided on a vehicle rear side and an upper surface of the housing of the power converter 2 with respect to the intake port 21. The air cooling device 22 includes, for example, a sirocco fan. Then, by operating the air cooling device 22, the air in the vehicle cabin 10 is sucked into the housing of the power converter 2 from the intake port 21. When the air flows in the housing, the power converter 2 is cooled while the air comes into contact with the electronic component or the like and removes heat.

The exhaust air after cooling the power converter 2 passes through the duct 3 in which the duct inlet portion 31 is connected to the air cooling device 22, and is discharged from the duct outlet portion 32 to the center side of the vehicle cabin 10 in the left-right direction of the vehicle 1. The exhaust air discharged from the duct outlet portion 32 passes through, for example, an exhaust air path A indicated by an arrow in FIG. 1, circulates in the vehicle cabin 10, is sucked again from the intake port 21 into the housing of the power converter 2, and is used for cooling the power converter 2. As described above, the exhaust air path structure of the power converter 2 according to the embodiment is completed in the vehicle cabin 10, and has a structure that does not have a discharge path for discharging exhaust air to the outside of the vehicle cabin 10.

Figure 2:
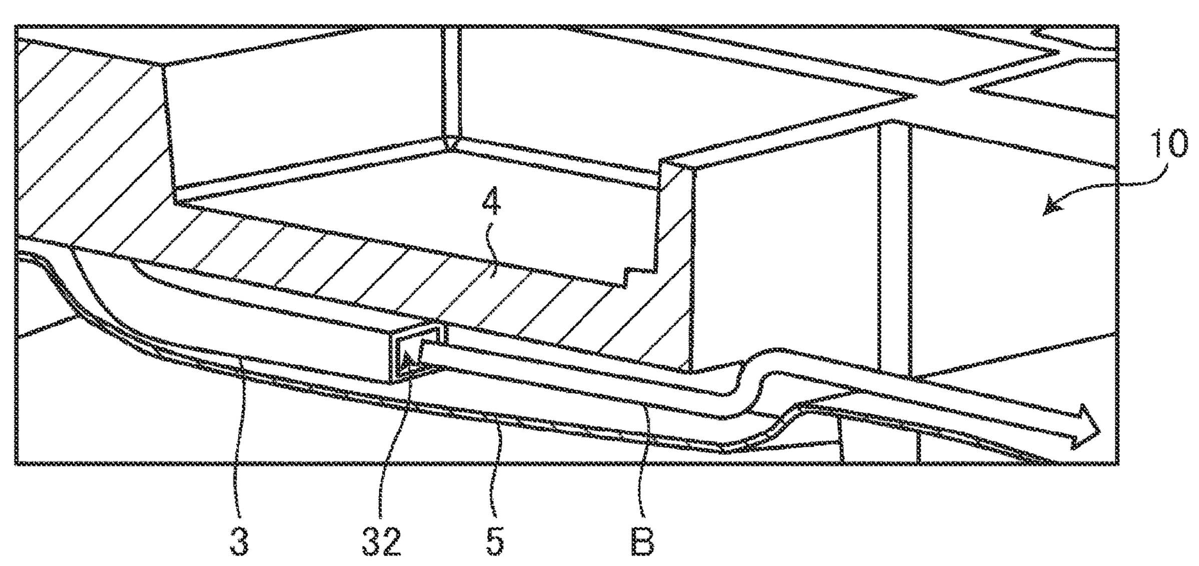
FIG. 2 is an enlarged view of the vicinity of a duct outlet portion of a duct in an exhaust air path structure of the power converter according to the embodiment.

FIG. 2 is an enlarged view of the vicinity of the duct outlet portion 32 of the duct 3 in the exhaust air path structure of the power converter 2 according to the embodiment.

The exhaust air path structure of the power converter 2 according to the embodiment has a structure in which the exhaust air path B indicated by an arrow in FIG. 2 is sandwiched from the vehicle vertical direction by members having different heat transfer rates. As shown in FIG. 2, the exhaust air path B is formed on the downstream side of the duct outlet portion 32 of the duct 3 in the exhaust air flow direction. In other words, in the exhaust air path structure of the power converter 2 according to the embodiment, the member forming the upper wall surface of the exhaust air path B and the member forming the lower wall surface of the exhaust air path B are constituted by members having different heat transfer coefficients. Specifically, in the exhaust air path B, a high heat insulating member which is a member having high thermal insulation is provided inside the vehicle cabin so as to form an upper wall surface of the exhaust air path B. Further, in the exhaust air path B, a high heat transfer member, which is a member having high heat conductivity, is provided on the outside of the vehicle cabin so as to form the lower wall surface of the exhaust air path B.

In the vehicle cabin 10 of the vehicle 1 according to the embodiment, the tool box 4 is provided to be as wide as the floor surface of the vehicle cabin 10 so as to cover the power converter 2, the duct 3, and the like from above. The tool box 4 is made of expanded polypropylene as a high heat insulating member. The tool box 4 is provided inside the vehicle cabin so as to form the upper wall surface of the exhaust air path B. Further, in the vehicle cabin 10 of the vehicle 1 according to the embodiment, the rear floor pan 5 is provided below the power converter 2, the duct 3, and the like so as to be as wide as the floor surface of the vehicle cabin 10. The rear floor pan 5 is made of a stainless steel plate having a thickness 0.5 [mm as a high heat transfer member. The rear floor pan 5 is provided on the outside of the vehicle cabin so as to form the lower wall surface of the exhaust air path B.

As a result, the exhaust air discharged from the duct outlet portion 32 is radiated to the outside of the vehicle cabin through the rear floor pan 5 (high heat transfer member) while the heat radiation to the inside of the vehicle cabin is suppressed by the tool box 4 (high heat insulating member) while passing through the exhaust air path B. Then, the exhaust heat radiated to the outside of the vehicle cabin returns to the intake port 21 provided in the housing of the power converter 2 through the exhaust air path A and the like shown in FIG. 1 inside the vehicle cabin 10. Thus, in the exhaust air path structure of the power converter 2 according to the embodiment, it is possible to reduce the temperature rise in the vehicle cabin 10 due to the heat of the exhaust air that has cooled the power converter 2. Further, in the exhaust air path structure of the power converter 2 according to the embodiment, since the temperature rise in the vehicle cabin 10 due to the heat of the exhaust air can be reduced, it is possible to suppress a decrease in the cooling efficiency of the power converter 2 due to the air cooling using the air in the vehicle cabin 10.

What is claimed is:

1. An exhaust air path structure of a power converter comprising:

the power converter provided in a vehicle cabin of a vehicle and including a housing and an electronic component housed in the housing, the housing having an intake port on a front surface in a vehicle front-rear direction of the vehicle;

a fan provided on an upper surface of the housing, the fan being located rearward of the intake port in the vehicle front-rear direction, and the fan being configured to suck air in the vehicle cabin through the intake port into the housing; and a duct connected to the fan and configured to discharge an exhaust air after the sucked air cools the electronic component, the duct extending along a first corner portion of the vehicle cabin, the first corner portion being constructed by a first wall of the vehicle cabin that extends along the vehicle front-rear direction and a second wall of the vehicle cabin that extends along a vehicle left-right direction of the vehicle, an outlet port of the duct being located at a center portion of the vehicle cabin in the vehicle left-right direction, the outlet port facing a third wall of the vehicle cabin that extends along the vehicle front-rear direction, and the second wall and the third wall constructing a second corner portion of the vehicle cabin, wherein the duct is configured to be sandwiched between a tool box provided inside the vehicle cabin and a floor pan provided outside the vehicle cabin.

2. The exhaust air path structure according to claim 1, wherein:

the tool box is made of expanded polypropylene; and the floor pan is made of stainless steel.

3. The exhaust air path structure according to claim 1, wherein the electronic component includes an alternating current charger.

* * * * *